United States Patent [19]

Regan

[11] Patent Number: 4,883,977

[45] Date of Patent: Nov. 28, 1989

[54] MAGNETIC POWER CONVERTER

[76] Inventor: Dennis J. Regan, 318 E. 18th St., Bakersfield, Calif. 93305

[21] Appl. No.: 69,633

[22] Filed: Jul. 6, 1987

[51] Int. Cl.[4] .............................................. H01F 27/42
[52] U.S. Cl. .................................. 307/401; 307/104; 310/254; 318/138
[58] Field of Search ................ 318/138, 254; 307/104, 307/401, 412, 413, 414, 415, 419; 310/49 R, 68 R, 179, 254, 259; 323/301, 302, 303

[56] References Cited

U.S. PATENT DOCUMENTS

| | | | |
|---|---|---|---|
| 2,689,328 | 9/1954 | Logan | 307/401 X |
| 2,777,987 | 1/1957 | Deal | 323/302 |
| 2,904,743 | 9/1959 | McClain | 323/302 |
| 3,473,069 | 10/1969 | Herbert | 318/138 |

FOREIGN PATENT DOCUMENTS

| | | | |
|---|---|---|---|
| 1090348 | 10/1960 | Fed. Rep. of Germany | 307/401 |
| 1159017 | 12/1963 | Fed. Rep. of Germany | 307/401 |
| 1180170 | 10/1964 | Fed. Rep. of Germany | 307/401 |

OTHER PUBLICATIONS

"A D.C. Controlled Magnetic Oscillator", IBM Technical Disclosure Bulletin, Vol. 3, No. 5, page 52, October, 1960.

Primary Examiner—Bentsu Ro
Attorney, Agent, or Firm—Michael Bak-Boychuk

[57] ABSTRACT

A symmetrical, figure 8 shaped, magnetic circuit is provided with reduced size end loops each including an electromagnetic reverse winding which, when excited, opposes the adjacent magnetic flux. A further set of forward windings adjacent each end loop is selectively turned on for developing such flux. As a result of sequential complementary switching of the reverse and forward windings, the center element of the magnetic circuit is impressed with an alternating magnetic flux for inducing power. An asymmetrical and a singly fed rotary power embodiment are also set out for operation in accordance with the foregoing principles.

9 Claims, 4 Drawing Sheets

MAGNETIC POWER CONVERTER

BACKGROUND OF THE INVENTION

1. Field of the Invention

The present invention relates to magnetic circuits and, more particularly, to apparatus and method for converting a static magnetic field to a time varying magnetic field.

2. Description of the Prior Art

In the science of electrical engineering the fundamental expressions of electromagnetism are defined by Ampere's Law. These relationships set out the magnetic quantities in terms of force, magnetic flux density, magnetic field intensity, permeability and similar factors.

It is well known that the magnetic behavior of matter, itself, is defined at the microscopic level. Thus an atom will experience a torque when placed in a magnetic field, often referred to as the magnetic moment. This magnetic moment depends upon the positive charges of the nucleus spinning on its axis, the negative charge of the electrons spinning on their axes and the effect of the electrons moving in their orbits. In this model the orbital motion of the electrons and their spin far exceed the moment of the nuclear, spinning, protons and electromagnetism is dominantly an expression of electron momentum.

Frequently atoms combine into molecules in such manner that the orbital motion of the electrons cancel each other out and a magnetic moment close to zero is thus effected. Thus, most substances provide magnetic flux density which is close to that of free space.

An exception to this general class is the class of materials consisting principally of iron in which the relative permeability is many times greater than that of free space. This class of materials is referred to as the "ferromagnetic class" and it is on the basis of this class of materials that most electromechanical devices are based. This class of materials, like all metals, is crystalline in structure with the atoms arranged in a spaced lattice. Unlike all the other metals, however, iron exhibits domains of sub-crystalline segments of varying sizes and shapes in which all the atoms are aligned in the same direction. These domains act independently of each other and in unmagnetized iron the domains are aligned haphazardly. The net magnetic moment then is zero on a large scale of any specimen. Upon the application of external magnetic field all the domains align parallel to each other and a state is reached which is referred to as the "saturated state". Simply, no further increase in flux density will occur in response to any further increase in magnetizing force. It is this limit on flux density that is the subject of most material science investigations.

The inductance of a magnetic field, in turn, is expressed by relationships discovered by Faraday. The distinguishing and significant feature of inductance is that it makes itself felt in the presence of a changing current or a changing flux. Thus, in a flux changing device the voltage across the terminals of an inductor may be expressed as:

$$E = -Ndf/dt$$

In this relationship, N is the number of turns of the inductor coil. This generalized relationship is correct both for electromagnetic flux changes and for flux changes occurring as result of physical flux cutting motion.

Those skilled in the art will appreciate that the same effect may be obtained by changes in magnetic permeability. For example, a magnetic loop operated at saturation will produce electromagnetic results in the presence of a change in saturation. At saturation the potential energy of the magnetic loop is simply the function of sectional area. Thus, the losses normally occurring in the course of hysteresis are limited only to that portion of the magnetic loop that is actually taken in or out of the magnetic circuit.

These aspects are utilized to advantage in the apparatus and method disclosed herein.

SUMMARY OF THE INVENTION

Accordingly, it is the general purpose and object of the present invention to provide a magnetic circuit in which virtual air gaps are produced over defined magnetic loop segments.

Other objects of the invention are to provide a magnetic circuit in which the hysteresis loss is confined to a fixed loop configuration.

Yet further objects of the invention are to provide a magnetic circuit which is functional both as electromagnetic and mechanical implementation.

Briefly, these and other objects are accomplished within the present invention by providing a dual magnetic loop core structure having a single, common magnetic element, the separate elements of each loop further including an electromechanical circuit for controlling the flux therethrough. As a consequence the hysteresis loss associated with electromechanical switching of each of the magnetic loops is confined to the area necessary to effect flux change. The center core piece that carries the sum of the two changing magnetic loops can then be used either to induce power into another circuit or to effect a magnetomotive force to advance shafts in rotation.

In more detail, the present invention utilizes a magnetic circuit configuration generally shaped as a figure 8 with the center element of the figure, referred to herein as the center core piece, serving as the common magnetic element. The two distal sides of this magnetic loop are then conformed as electromagnetic loop segments, wound in opposite polarity, to create virtual air gaps in each loop segment when the coils are excited. Thus, when the winding of each loop is excited the magnetic flux through that loop will consequently change. As a result the center core piece of the magnetic loop will exhibit a variation in magnetic flux and will thus induce electrical power to any coil mounted thereon or will produce changes in magnetomotive force onto any wound device inserted therebetween.

Those skilled in the art will appreciate that the foregoing loop when driven at saturation will exhibit a magnetic potential which is substantially fixed in each loop. The magnetic flux through each loop is thus controlled by the virtual air gap without a change in the magnetization potential. Thus, the large portions of the core pieces forming the loop are not subjected to hysteresis, the principal location of all hysteresis occurring in the loop segments effecting the virtual air gap. In consequence, very low losses are effected to produce energy transformation or to produce mechanical power.

In accordance with the foregoing principles other alternatives may be implemented which, in addition, utilize a series inserted electromagnetic piece in the loop. This electromagnetic piece may then be connected for excitation in complement with the switching of the electromagnetic loop segments and thus is useful in reorienting the magnetic flux alignment when the virtual air gap is effected. Of course, in the presence of such a virtual air gap the flux density (work) is virtually negligible, comprising mostly the work necessary for reorientation which, to a large extent, is an expression of the hysteresis loss.

DESCRIPTION OF THE SPECIFIC EMBODIMENT

Figure 1:
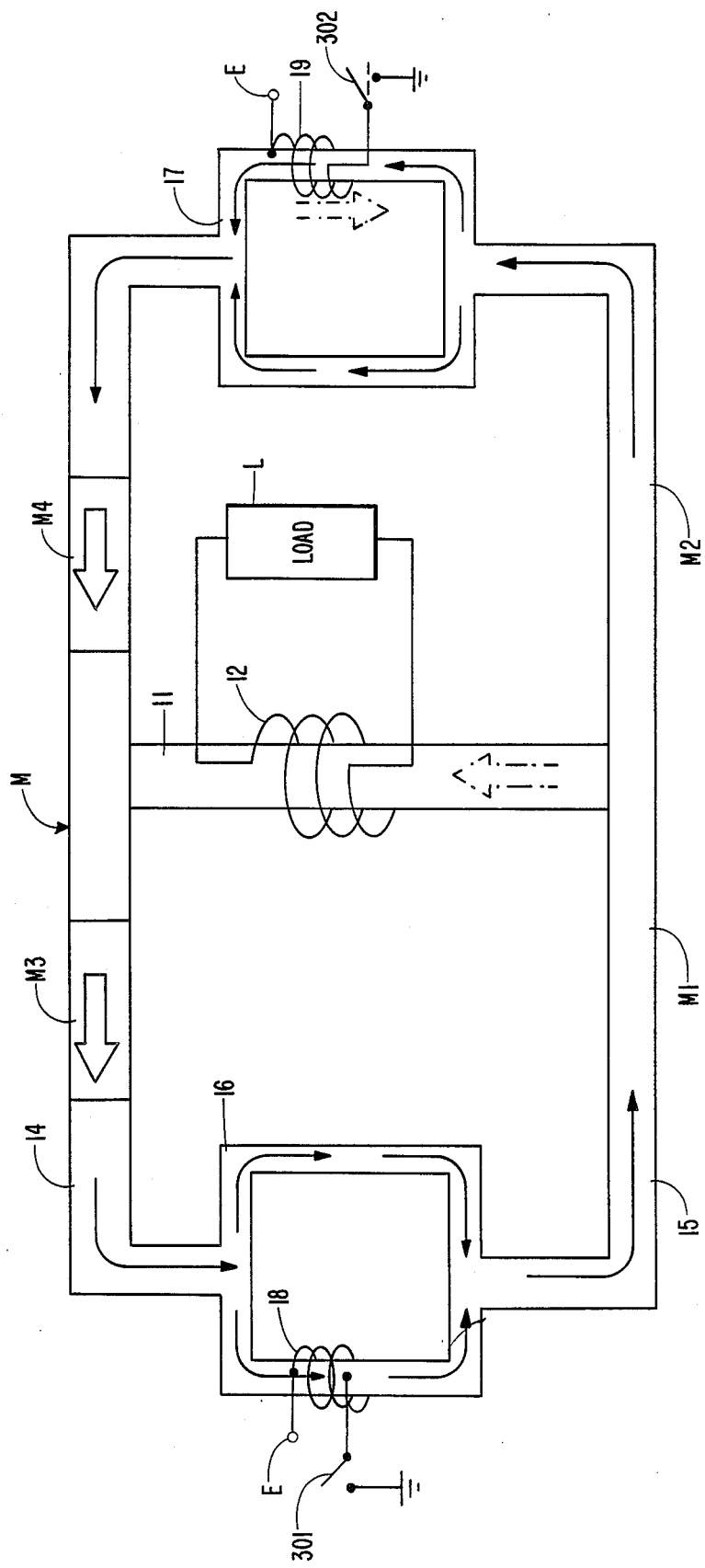
FIG. 1 is a diagram of the magnetic circuit effected in accordance with the present invention.

The concepts entailed herein are best explained by reference to FIG. 1. As shown in this figure a magnetic circuit, generally designated at M, includes two ferromagnetic loops M1 and M2 which share a common center element or center core piece 11. This core piece 11 extends between two transverse pieces 14 and 15, referred to herein as the upper and the lower ferromagnetic pieces respectively. The ferromagnetic piece 14 may, furthermore, include magnetized segments M3 and M4 on either side of piece 11, each aligned for the same polarity. The distal ends of pieces 14 and 15 then abut with closed ferromagnetic end loops 16 and 17.

In this form a magnetic circuit is devised in which little or no flux is carried in the center piece 11. Simply, the magnetic potential between the manetized segments M3 and M4 is substantially greater than the potential across the ends of piece 11. If, however, either magnetic loop Ml or M2 is interrupted then the magnetic flux through center piece 11 will rise at the polarity of the uninterrupted loops.

Thus each loop 16 an 17 is provided with a corresponding winding 18 and 19 both connected for excitation at one end to a source E and grounded at the other ends across switches 301 and 302. The electromagnetic polarity of each coil 18 and 19, moreover, is opposite to the polarity of the magnetic loops M1 and M2. Thus when switch 301 is turned on a magnetic loop is set up in the end loop 16 opposing the magnetic circuit M1. In consequence the flux generated in the segment M4 will pass into the center piece 11. When switch 302 is turned on the opposite is achieved with the opposed direction flux from segment M3 passing into piece 11. In consequence, an output coil 12 fixed on piece 11 will generate electrical power to a load L.

The same may be achieved by switching electromagnets in lieu of permanent magnetic segments M3 and M4. For convenience parts operative in like manner to that previously described are designated by like numerals.

As shown in FIGS. 2 through 5 the invention herein disclosed in its switched form and generally designed by the numeral 10 comprises once again the center core piece 11 onto which output coil 12 is wound. Core piece 11 may be formed of any ferromagnetic material abutting at its ends in a T abutment against the upper and a lower ferromagnetic piece 14 and 15. The ends of the ferromagnetic pieces 14 and 15, in turn, connect to the corresponding ferromagnetic loops 16 and 17, each having wound around one portion thereof corresponding winding 18 and 19. The polarity of windings 18 and 19 is then selected such that when the winding is excited a magnetic field opposing the magnetic vector between pieces 14 and 15 is generated in the corresponding loop. Thus, when winding 19 is connected for excitation, loop 17 will produce a magnetic field which is opposite to the field carried in the legs of the pieces 14 and 15. Similarly, when coil 18 is connected for excitation loop 16 will produce a magnetic field opposite to the field vector between pieces 14 and 15.

Of course, associated with each induced polarity reversal of the magnetic loops 16 and 17 is a parasitic reorientation of the subcrystalline particles making up the ferromagnetic structure thereof. This reorientation persists, as hysteresis, even after the excitation to coils 18 and 19 is turned off. Ordinarily such parasitic reorientation uses up power in the course of flux reversal. To reduce these losses, and the other higher order terms associated therewith, the piece 14 includes in series alignment a corresponding pair of flux sources 114 and 214 spaced on either side of core piece 11. These flux sources may be variously implemented and may preferably be once again switched electromagnetic devices including windings 116 and 216. Winding 116 is aligned in opposition to winding 18 while the polarity of winding 216 opposes the magnetic vector of winding 19.

Figure 2:
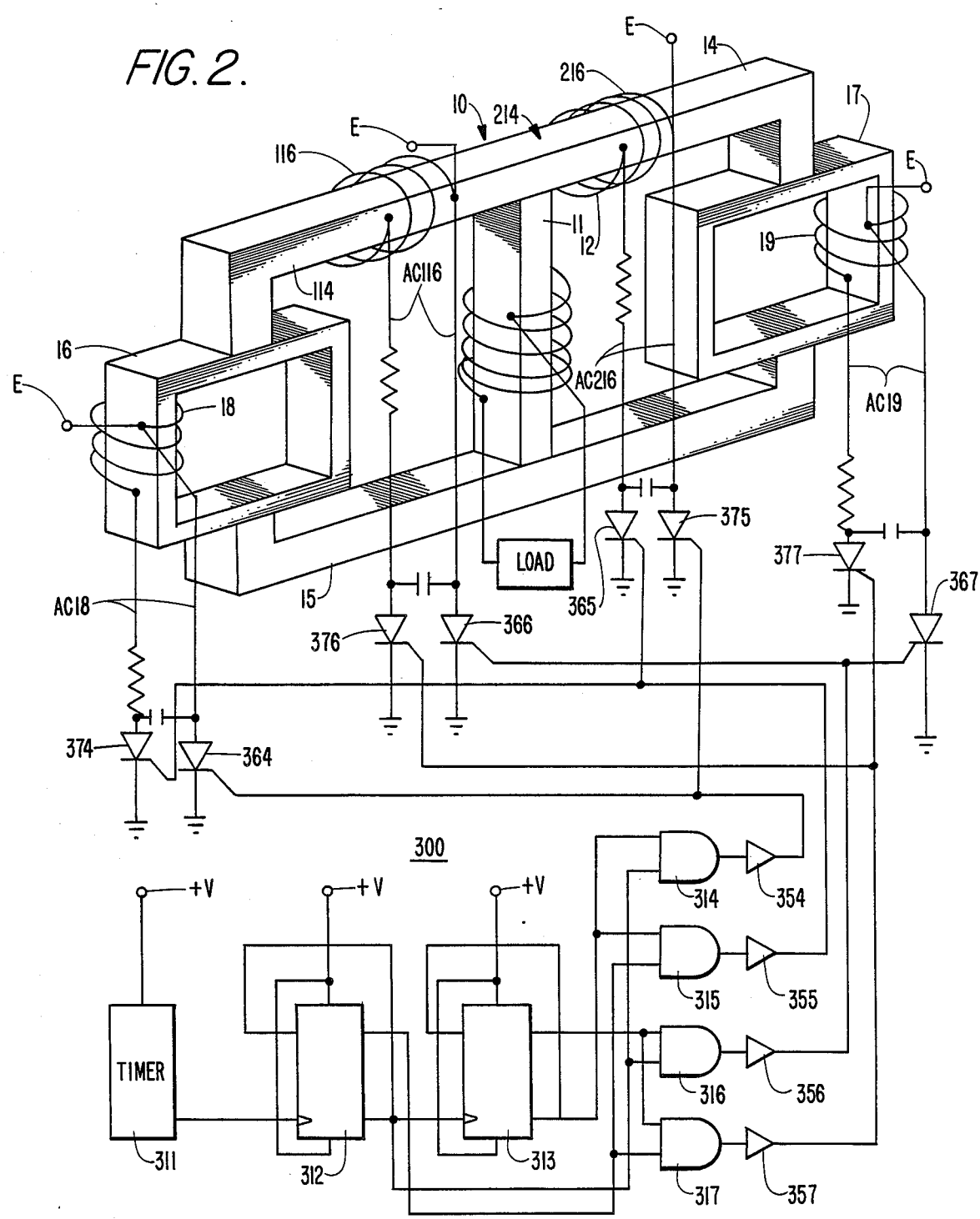
FIG. 2 is a perspective illustration of a magnetic circuit constructed in accordance with one form of the invention herein.
Figure 3:
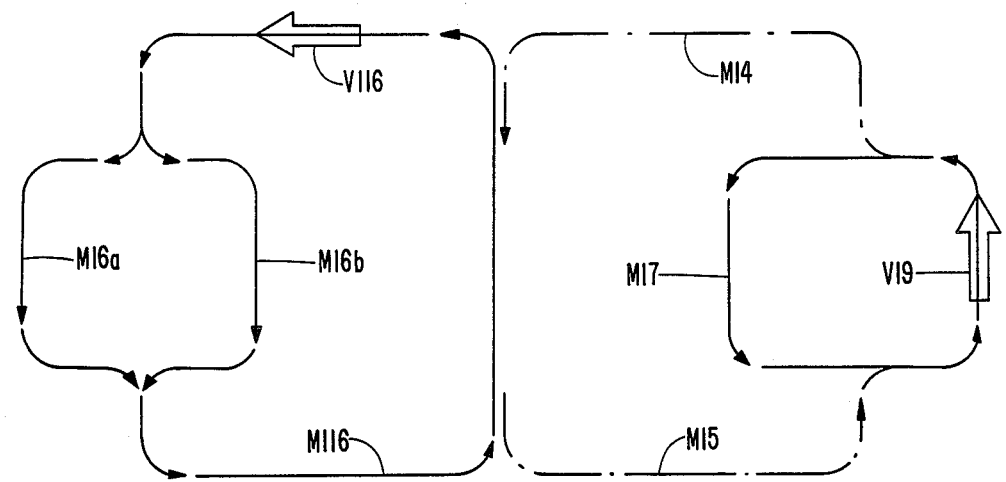
FIG. 3 is a diagram of the magnetic loop effected by the structure shown in FIG. 2.

By particular reference to FIGS. 2 and 3 wherein the physical structure is illustrated in FIG. 2 and its resulting magnetic circuit is shown in FIG. 3, this winding arrangement effects an alternating loop in which the reversals are confined mainly to loops 16 and 17 (FIG. 3). For example, when winding 116 (FIG. 2) is excited, producing an electromagnetic vector V116 (FIG. 3), a magnetic loop M116 (FIG. 3) is formed including parallel paths M16a and M16b through the legs of loop 16. Conversely, when winding 19 (FIG. 2) is excited an electromagnetic vector V19 (FIG. 3) is impressed onto loop 17 resulting in a magnetic circuit M17 confined mainly to this loop. Of course, a secondary magnetic loop, shown as M14 and M15 (FIG. 3) will also occur, opposite in polarity to the magnetic direction through core piece 11 impressed by the magnetic loop M116. Thus by selecting a switching sequence of coils 18, 19, 116 and 216 an alternative magnetic field may be impressed onto the core piece.

When driven to saturation loops 16 and 17 will produce effective air gaps between the ends of pieces 14 and 15, altering the magnetic flux through the pieces. By selecting a sectional area of elements 14 and 15, smaller or equal to the sectional area of element 11, the saturation limit of these ferromagnetic loops will occur in the legs 14 and 15.

Accordingly, the magnetic flux within the center core piece 11 is limited by the saturation flux in legs 14 and 15. Since this saturation flux branches into the two end loops 16 and 17, the maximum flux level within the center core piece 11 is, at best, two times the saturation level of each of the legs. Loops 16 and 17, in turn, are sized at sectional dimensions, once again selected to meet the saturation limits.

At steady state conditions these considerations of saturation density adequately determine core sizing. When, however, magnetic flux reversals occur each reversal entails a residual reorientation of magnetic polarity, i.e., hysteresis. This residual effect, in itself, consumes power unless corrected and it is the initial transient of coils 116 and 216 that provides the correction. Thus, when coils 18, 116 and 216 are wholly unpowered (open) a magnetic path is established which is in phase or polarity to that previously determined by vector V116, excepting through the core piece 11. Concurrently, when the coil 19 is excited, as shown at vector V19 (FIG. 3), being of the opposite polarity to the magnetic polarity of the legs 14 and 15, an effective air gap is formed between that side of the legs expressed by the closed magnetic loop M17. This air gap, however, occurs with an associated hysteresis contained mainly within the corresponding loops 16 or 17. Accordingly, coil 116 is excited during the time when coil 18 is turned off, realigning the ferromagnetic particles in the loop 16 by its initial transient. Similarly coil 216 is excited when coil 19 is turned off repolarizing loop 17. Except for the resistive losses in each of the coils 116 and 216 the consequent power loss is thus mainly expended to correct the hysteresis.

Figure 5:
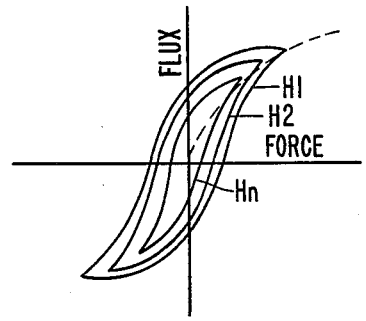
FIG. 5 is a magnetization hysteresis diagram effected in portions of the structure shown in FIG. 1.

Those skilled in the art will appreciate that major losses entailed in a ferromagnetic device are losses associated with hysteresis. As shown in FIG. 5, a typical hysteresis curve of a ferromagnetic material the flux tends to lag behind the field intensity in consequence to the previous orientation. This is exhibited as the hysteresis curves H1–Hn in response to a symmetrically cyclic condition. The difference between the hysteresis limits represents the amount of energy which is not returned to the system and is dissipated as heat commonly referred to as "hysteresis loss". Since in this instances the hysteresis loss is the loss confined to loops 16 and 17 (FIG. 2) and since the area sections of these loops have to only to meet the saturation limits of legs 14 and 15, a substantial reduction of hysteresis loss is achieved.

By impressing a switched signal source AC18 (FIG. 4) onto coil 18 and another switched signal source AC19 onto coil 19, a cyclic generation of an air gap between either ends of legs 14 and 15 is developed. Phased in time and in complement with these cyclically switched signals coils 116 and 216 are switched as signals AC 116 and AC 216. This, in turn, produces a cyclic pattern for the flux density through the core piece 11 then converted to electrical power in coil 12. As a result, substantial power transformation can be made without the attendant large hysteresis loss heretofore suffered.

Of course, the output of coils 116 and 216 needs only to meet the hysteresis contribution. The hysteresis is as shown in the curves H1–Hn in FIG. 5 and consumes power proximate the zero crossings. As a result the power input to coils 116 and 216 may be timed for minimal power consumption and to produce a shaped magnetic flux pattern through core piece 11.

Figure 4:
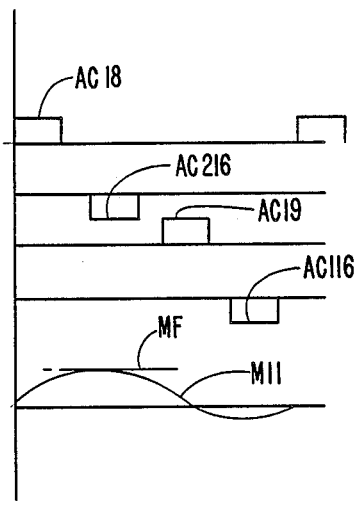
FIG. 4 is a graphical illustration of the electrical output signals generated in the course of use of the structure shown in FIG. 1.

These resulting signals are shown in FIG. 4. In this illustration the magnetic flux density M11 in the core piece 11 is limited by the maximum flux limit MF at its upper limit and by a partial reversal at its lower end. Core piece 11 thus carries a magnetic flux which varies from the maximum to the lower limits. The current IC induced into coil 12, responds to changes in the flux and thus core losses are substantially reduced in the transfer of power.

Figure 6:
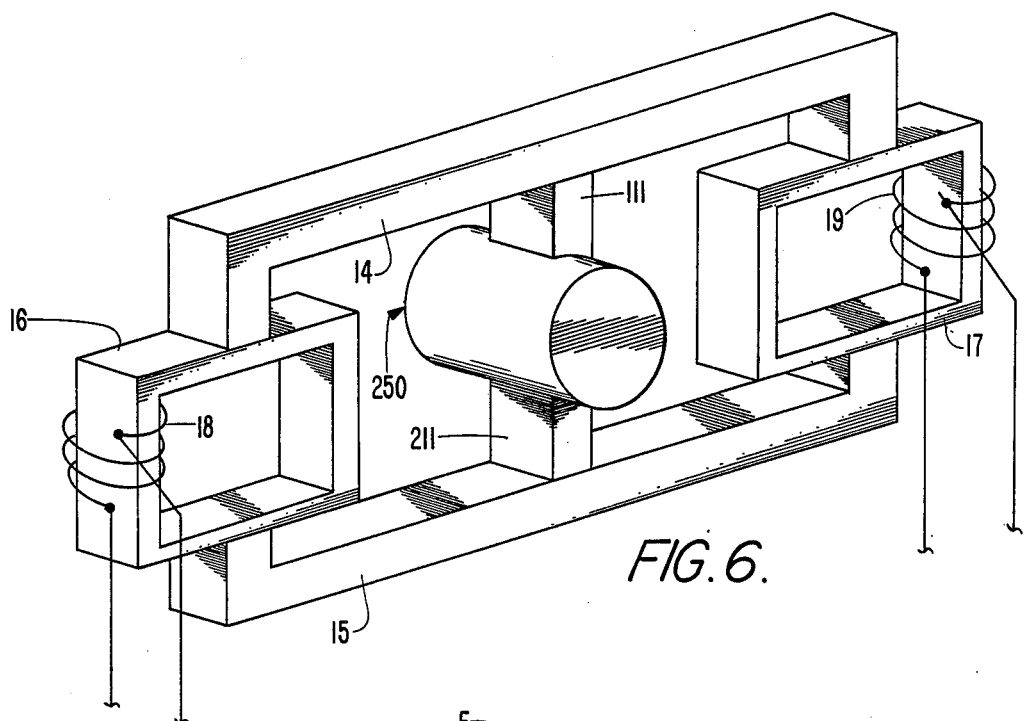
FIG. 6 is yet another perspective illustration of an alternative embodiment of the invention herein.

By reference to FIG. 6 a similar implementation may be used to drive a mechanical device. For the purposes herein, similar functions are obtained from similarly numbered parts, the distinction being primarily in the operation of the center core piece 11. In this example, core piece 11 is replaced by two opposed pole pieces 111 and 211 between which a wound armature 250 is placed. The alternating field, developed in accordance with the above teachings, across the pole pieces 111 and 211 then produces the necessary magnetomotive force onto the armature 250 to produce mechanical power.

In each implementation the switching is carried out by way of a switching assembly 300 (FIG. 2) comprising a logic stage and a driver stage, illustrated in detail in FIG. 2. Logic stage includes a timer 311 such as model 555 timer sold by the Intel Corporation, Santa Clara, Calif., having the time out output thereof connected to the clock input of flip flop 312 looped back to its set input to operate as a pulse generator. The output of this flip flop is furthermore fed to the clock input of yet another D flip flop 313 and to the input side of two AND gates 314 and 315 which also collect one output of flip flop 313. The other outputs of flip flops 312 and 313 are then combined in AND gates 316 and 317. Gates 314 and 315 across corresponding drivers 354 and 355 then turn on silicon controlled rectifiers (SCRs) 364 and 365, respectively in series with the corresponding coils 16 and 216 and 17 and Gates 316 and 317, in turn, strobe into conduction, across drivers 356 and 357, SCRs 366 and 367 in series with coils 116 and 19 and SCRs 376 and 377 capacitively connected across SCRs 364 and 365 to turn these off. Thus coils 16 and 17 and 116 and 216 are sequentially turned on and off in a complementary sequence.

Figure 7:
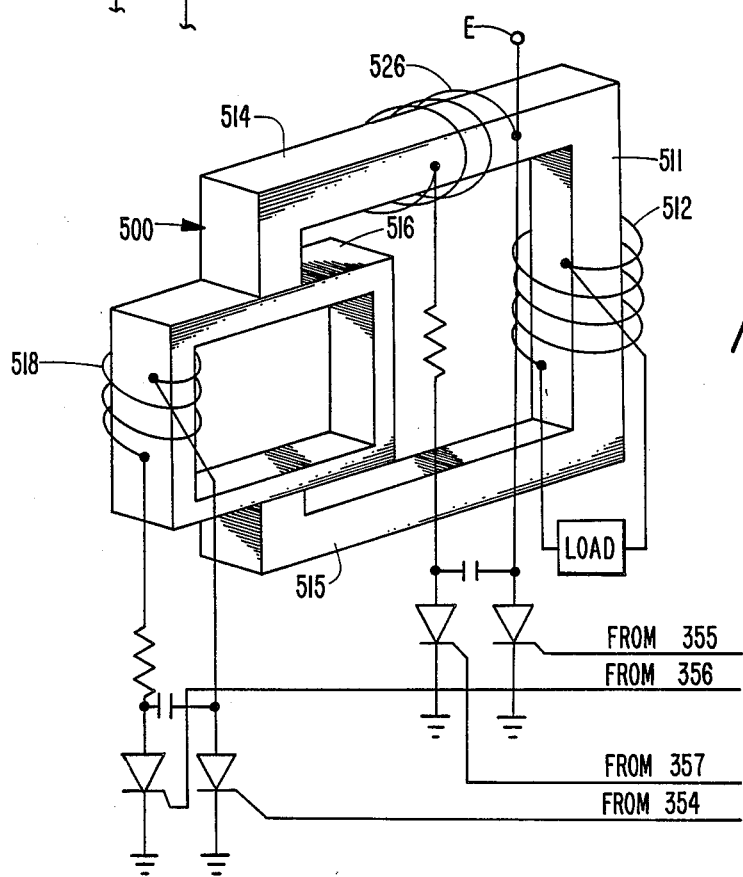
FIG. 7 is a further alternative of an asymmetrical implementation, illustrated in perspective, of the inventive magnetic circuit.

A further alternative, illustrated in FIG. 7 and generally numbered at 500, may be rendered operative in an asymmetrical configuration. As shown in this output figure the output coil 512 is wound around an core piece 511. This core piece is in a ferromagnetic circuit including elements 514 and 515 which then couple across a loop 516. Once again, a reverse polarity winding 518 is affixed to loop 516 to effect a virtual air gap when excited. Another winding 526 on element 514 is then useful to repolarize the magnetic alignment when winding 517 is turned off. The switching circuit 300, previously described, is then useful in turning coils 517 and 518 on and off, in a manner previously described and like-numbered.

As a result the magnetic flux in the core 511 piece is modulated to effect transformation of electrical power.

Obviously many modifications and changes may be made to the foregoing description without departing from the spirit of the invention. It is therefore intended that the scope of the invention be determined solely on the claims appended hereto.

What is claimed is:
1. A ferromagnetic structure comprising:
   an elongate center core piece of ferromagnetic material structure defined by an upper and a lower end;
   a first and a second elongate ferromagnetic transverse piece respectively aligned in magnetic proximity across said upper and lower ends, each said first and said second piece being defined by a corresponding left and a corresponding right end;

a left and a right ferromagnetic loop respectively interposed between the corresponding ones of said left ends and said right ends;

a left and a right reverse winding respectively fixed on said left and said right ferromagnetic loops;

a left and right forward winding respectively fixed adjacent said left and said right ends of said transverse piece; and switching means connected to said left and right reverse windings and said left and right forward windings for providing electrical excitation thereto in an interposed sequence whereby the excitation of said left reverse winding is followed by the excitation of said right forward winding and the electrical excitation of said right reverse winding is followed by the excitation of said left forward winding.

2. The ferromagnetic structure according to claim 1, further including:

power output means deployed for inductive coupling adjacent said center core piece.

3. The ferromagnetic structure according to claim 2, wherein:

said power means includes a wound armature mounted for rotation adjacent said center core piece.

4. The ferromagnetic structure according to claim 3, wherein:

said center core piece includes an upper and a lower segment aligned adjacent said armature.

5. A magnetic circuit comprising:

a ferromagnetic core piece having an upper and a lower end;

an upper and a lower ferromagnetic transverse piece respectively aligned in magnetic proximity adjacent said upper and lower ends of said core piece;

a closed ferromagnetic loop fixed between said upper and lower transverse pieces;

a reverse winding affixed on said closed loop;

a forward winding affixed to said upper transverse piece; and switching means for alternatively applying electrical excitations to said reverse and forward windings.

6. The magnetic circuit according to claim 5, further comprising:

power output means deployed for inductive coupling around said ferromagnetic core piece.

7. The magnetic circuit according to claim 6, wherein:

said power output means includes a wound armature mounted for rotation adjacent said ferromagnetic core piece.

8. A ferromagnetic structure comprising:

an elongat center core piece of ferromagnetic material structure defined by an upper and a lower end;

a first and a second elongate ferromagnetic transverse piece respectively aligned in magnetic proximity across said upper and said lower ends, each said first and said second piece being defined by a corresponding left and a corresponding right end;

a left and a right ferromagnetic loop respectively interposed between the corresponding ones of said left ends and said right ends;

a left and a right reverse winding respectively fixed on said left and said right ferromagnetic loops;

a left and a right forward winding respectively fixed adjacent said left and said right ends of said transverse piece, said left and said right forward winding respectively having a polarity opposite to the electromagnetic polarity of said left and said right reverse winding; and switching means for alternatively providing electrical excitation to said left and said right reverse winding.

9. The ferromagnetic structure according to claim 8, further including:

power output means deployed for inductive coupling adjacent said center core piece.

* * * * *